United States Patent [19]

Harrison et al.

[11] 4,309,304
[45] Jan. 5, 1982

[54] LIQUID CRYSTAL COMPOSITIONS FOR MULTIPLEXED DISPLAYS

[75] Inventors: Kenneth J. Harrison, Malvern Link, England; Leo T. Carlino, Los Gatos, Calif.

[73] Assignee: Exxon Research & Engineering Co., Florham Park, N.J.

[21] Appl. No.: 191,775

[22] Filed: Sep. 29, 1980

Related U.S. Application Data

[63] Continuation-in-part of Ser. No. 90,103, Nov. 1, 1979, abandoned.

[51] Int. Cl.³ .......................... C09K 3/34; G02F 1/13
[52] U.S. Cl. ........................... 252/299.63; 252/299.5; 350/350 R
[58] Field of Search ........... 252/299.63, 299.5, 299.66, 252/299.67; 350/350 R, 350 S

[56] References Cited

U.S. PATENT DOCUMENTS

| | | | |
|---|---|---|---|
| 3,947,375 | 3/1976 | Gray et al. | 252/299.66 |
| 3,974,087 | 8/1976 | Gray et al. | 252/299.66 |
| 4,002,670 | 1/1977 | Steinstrasser | 252/299.64 |
| 4,011,173 | 3/1977 | Steinstrasser | 252/299.5 |
| 4,083,797 | 4/1978 | Oh | 252/299.66 |
| 4,113,647 | 9/1978 | Coates et al. | 252/299.62 |
| 4,137,192 | 1/1979 | Matsufuji | 252/299.66 |
| 4,147,651 | 4/1979 | Oh | 252/299.66 |
| 4,154,697 | 5/1979 | Eidenschink et al. | 252/299.63 |

FOREIGN PATENT DOCUMENTS

| | | | |
|---|---|---|---|
| 2752975 | 8/1978 | Fed. Rep. of Germany | 252/299.63 |
| 2854310 | 6/1979 | Fed. Rep. of Germany | 252/299.63 |
| 105701 | 5/1974 | German Democratic Rep. | 252/299.63 |
| 54-101784 | 8/1979 | Japan | 252/299.63 |
| 54-118389 | 9/1979 | Japan | 252/299.63 |
| 54-6884 | 1/1979 | Japan | 252/299.63 |
| 54-148184 | 11/1979 | Japan | 252/299.63 |
| 54-152684 | 12/1979 | Japan | 252/299.63 |
| 1452826 | 10/1976 | United Kingdom | 252/299.63 |
| 2017742 | 10/1979 | United Kingdom | 252/299.63 |

*Primary Examiner*—Teddy S. Gron
*Attorney, Agent, or Firm*—Robert S. Salzman

[57] ABSTRACT

In accordance with the invention, a liquid crystal composition for multiplexed twisted neumatic displays which exists in a nematic mesophase from at least about −20° C. to 50° C. comprises:

(a) From three to five cyanobiphenyl compounds represented by the formula:

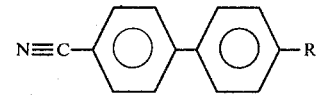

wherein R is selected from the group consisting of straight chain alkyl groups having two to ten carbon atoms, the propoxy radical ranging from about 5 to 12% by weight of the total composition, and the substituent

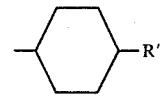

ranging from about 5 to 12% by weight of the total composition wherein R' is selected from the group consisting of straight chain alkyl groups having three to five carbon atoms, and wherein the saturated ring has a trans conformation, at least one of said compounds having R as an alkyl group with two to five carbon atoms and wherein compounds having R as an alkyl group with two or four carbon atoms range from about 3 to 10% by weight of the total composition and at least one of said compounds having R as an alkyl group with seven to ten carbon atoms and ranging from about 20 to 50% by weight of the total composition;

(b) at least one cyclohexane carboxylate ester compound represented by the formula:

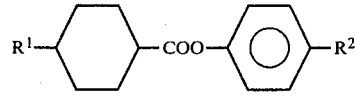

wherein R¹ is selected from the group consisting of straight chain alkyl groups having two to three carbon atoms, wherein R² is selected from the group consisting of straight chain alkoxy groups having three to six carbon atoms, and wherein the saturated ring has a trans conformation; and (c) at least one para-substituted phenyl benzoate ester represented by the formula:

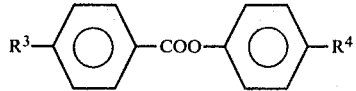

wherein R³ is selected from the group consisting of straight chain alkyl groups having three to seven carbon atoms, and wherein R⁴ is selected from the group consisting of straight chain alkyl groups having five to nine carbon atoms.

8 Claims, No Drawings

LIQUID CRYSTAL COMPOSITIONS FOR MULTIPLEXED DISPLAYS

CROSS-REFERENCE TO RELATED APPLICATIONS

This application is a continuation-in-part of previously filed, copending U.S. application Ser. No. 90,103, filed Nov. 1, 1979, now abandoned.

BACKGROUND OF THE INVENTION

1. Field of the Invention
1. Field of the Invention

The invention is directed to liquid crystal compositions and, in particular, to liquid crystal compositions which are useful in multiplexed twisted nematic display devices, with the nematic phase existing from at least about −20° to at least about 50° C.

2. Description of the Prior Art

Liquid crystal displays are now being employed in numerous commercial applications as electro-optical indicator systems and many types of these systems have now been developed, including those utilizing the twisted nematic field effect. For display devices based on the twisted nematic field effect, it is now recognized that the liquid crystal composition should exhibit positive dielectric anisotrophy, a mesomorphic temperature range, including room temperature, of at least 0° C. to 40° C., a birefringence of about 0.13 or greater, a low viscosity for good response times, and be preferentially aligned on supporting substrates to constitute an initially twisted structure. A number of methods are known in the prior art to produce suitable alignment of liquid crystal materials, as is apparent to the artisan.

In addition to the above-mentioned desirable characteristics, the liquid crystal material should, for long term device reliability, be an eutectic composition, have high purity, and exhibit good chemical, photochemical and electrochemical stability.

Where the number of addressed elements in a liquid crystal display is small, separate connections are made to each element, i.e., one driver per element. In this "static drive" mode, zero voltage is applied to an unselected (OFF) element, and a finite voltage greater than the threshold ($V_{Thr}$), to selected (ON) elements. Such addressing may be used in simple wristwatch displays (4 to 6 digits, 7 segments per digit) where the threshold voltage is typically <1.5 V and the operating voltage is 3 V.

Many liquid crystal compositions are known that meet the majority of the above requirements and may be obtained commercially, e.g., cyanobiphenyl compounds may be obtained from B.D.H. Chemicals Ltd., Poole, Dorset BH12 4NN, England.

For complex, multi-element displays, e.g., calculator, alpha-numeric, dot matrix displays, it may not be possible to make separate connections to each element and some form of multiplexing or matrix addressing (time sharing) is required. Liquid crystal displays in general, and twisted nematic displays in particular, change their optical properties in response to the RMS (root mean square) value of the alternating voltge. In this "dynamic drive" mode, a finite voltage ($V_{off}$) is applied to unselected (OFF) elements and a higher voltage to the selected (ON) elements. To avoid "crosstalk", where an unselected (OFF) element appears visible, $V_{off}$ is set below the threshold voltage ($V_{Thr}$). For conventional multiplexing, there is a maximum value of the ratio $V_{on}:V_{off}$ dependent upon the number of scanned rows (n), $$\frac{V_{on}}{V_{off}} = \sqrt{\frac{\sqrt{n}+1}{\sqrt{n}-1}}$$

The relationship between $V_{on}:V_{off}$ and number of scanned rows (n) may be seen as follows:

| n | $R = \frac{(V_{on})rms}{(V_{off})rms}$ |
|---|---|
| 2 | 2.414 |
| 3 | 1.932 |
| 4 | 1.732 |
| 5 | 1.618 |
| 6 | 1.543 |
| 7 | 1.488 |
| 8 | 1.447 |
| 9 | 1.414 |
| 10 | 1.387 |

To achieve a decreased duty cycle (i.e., greater number of scanned rows), the liquid crystal composition and display construction must be chosen to reduce the $V_{on}:V_{off}$ ratio, since "crosstalk" does not allow the $V_{off}$ voltage to be scaled to increase the $V_{on}$ voltage and give equivalent contrast at a lower duty cycle.

The threshold voltage ($V_{Thr}$), which determines the $V_{off}$ voltage is not a single value for a given liquid crystal composition and display construction, but varies as a function of the angle of viewing and temperature. Furthermore, the twisted nematic display is characterized by a shallow electro-optic transmission curve.

The effects of liquid crystal material birefringence ($\Delta n$), cell spacing, and surface alignment on the electro-optic characteristics of a twisted nematic display indicate that the $V_{on}:V_{off}$ ratio is minimized by using a low birefringent material, a thin cell spacing, and a near zero tilt surface alignment. Furthermore, the threshold voltage ($V_{Thr}$) and the sharpness of the contrast curve is determined by the dielectric anisotropy and the ratios of the three elastic constants (splay $k_{11}$, twist $k_{22}$, bend $k_{33}$). A favorable combination of these parameters leads to a sharp "knee" in the electro-optic transmission curve and thus a lower $V_{on}:V_{off}$ ratio.

The temperature dependence of the threshold, an intrinsic property of the liquid crystal composition, varies from class to class of materials. Where temperature compensation of the addressing voltages is not done, the $V_{off}$ voltage is set at the highest operating temperature to avoid crosstalk at lower temperatures and is the most significant parameter in producing low duty cycle, multi-element displays.

Liquid crystal compositions to effect a reduction in the ratio $V_{on}:V_{off}$ have recently been formulated from mixtures of positive (Np) and negative (Nn) dielectric anisotropy components, rather than purely positive materials. A few of the latter type of compositions exhibit satisfactory multiplexing characteristics, e.g., pure cyanobiphenyls/terphenyl mixtures, known as "E26M" and "E25M" which are available from B.D.H. Chemicals Ltd., Poole, Dorset BH12 4NN, England. However, such compositions whilst having quite sharp threshold characteristics, do exhibit a large temperature-threshold variation. Liquid crystal compositions of cyanophenylcyclohexanes (Np) and esters (Nn) exhibit low temperature-threshold dependence, but do not have sharp electro-optic transmission curves, e.g., compositions known as "ZL1 1216" and "ZL1 1253" which are available from E.M. Laboratories, 500 Executive Boulevard, Elmsford, N.Y. 10523. Liquid crystal compositions of cyanobiphenyls (Np) and benzoate esters (Nn) have been used in low duty cycle (1 in 7) multiplexed displays particularly for displays where temperature compensation is done (see, for example, K Odawaru et al, "An 80-Character Alphanumeric Liquid Crystal Display System for Computer Terminals", S.I.D. Digest, paper number 13.6, 1979).

To compare the "degree of multiplexing" of the different types of liquid crystal compositions, a figure of merit may be defined when the compositions are examined under the same conditions of cell spacing, surface alignment, polarizer combination, addressing waveform, illumination and detection system. The merit number may be defined by the ratio of the minimum threshold voltage to the voltage for a given transmission (contrast or contrast ratio) at a particular position of viewing of the display. This has been done for a number of presently available "multiplexing mixtures". (See E.P. Raynes, "Recent Advances in Liquid Crystal Materials and Display Devices", IEEE/SID Biennial Display Research Conference pp. 8-11, 1979.) Mixtures of different classes of liquid crystal materials, particularly those of positive and negative dielectric anisotropy, produced compositions with enhanced multiplexing capability.

It is known that some liquid crystal compositions of purely nematic components exhibit induced smectic behavior, thus decreasing the useful operating temperature range of the composition in a twisted nematic display device. Whilst components from a single class of compounds may show this behavior, (e.g., mixtures of higher homologues of cyanobiphenyls), mixtures of different classes of compounds exhibit this behavior most readily, particularly Np and Nn materials, e.g., cyanobiphenyls and benzoate esters. Specific examples of mixtures of terminal nonpolar and polar liquid crystals are given in B. Engelen et al, Molecular Crystals and Liquid Crystals, Vol. 49 (letters), pp. 193-197, 1979, and Ch. S. Oh. Molecular Crystals and Liquid Crystals, Vol. 42, 1, 1977. Such behavior limits the choice and composition of components (see U.S. Pat. No. 4,147,651) for an adequate temperature range of operation of a twisted nematic display device.

The degree of alignment of the liquid crystal composition is extremely important to producing a twisted nematic display, both the electro-optical performance, and the longevity of the display device being critically determined by this interface. Many alignment methods are known in the prior art, both organic and inorganic layers and different classes of liquid crystal materials are oriented to greater or lesser degrees by these surfaces. Of particular interest are alignment surfaces that will withstand high temperatures as seen in sealing display cells with glass frit to enable fabrication of hermetic packages. As is now well-known, silicon monoxide may be deposited to give a suitable alignment surface for multiplexed displays.

It is the inventor's experience that such surfaces do not align, over broad temperatures, many liquid crystal compositions incorporating prior art mixtures of cyanobiphenyls and benzoate esters, particularly those that give good multiplexing behavior on other surfaces, e.g., polyvinyl alcohol rubbed surfaces. This is seen as a major drawback to the use of such compositions in long life glass frit sealed displays.

To the nematic phase of liquid crystal compositions used in the twisted nematic display, it is common to add a small percentage of an optically active component which may or may not be a cholesteric liquid crystal. The resultant long pitch cholesteric liquid crystal composition has a unique sense of twist in the display cell and eliminates the possible existence of reverse twist areas.

Nonetheless, notwithstanding the formidable selection of mixtures of active compounds described in the prior art, it is believed that the prior art teachings nowhere teach, nor do they render obvious, the particular compositions of the present invention which have advantageous liquid crystal display characteristics.

SUMMARY OF THE INVENTION

In accordance with the invention, a liquid crystal composition for multiplexed twisted neumatic display which exists in a nematic mesophase from at least about −20° C. to 50° C. comprises:

(a) From three to five cyanobiphenyl compounds represented by the formula:

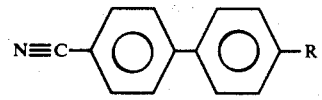

wherein R is selected from the group consisting of straight chain alkyl groups having two to ten carbon atoms, the propoxy radical, ranging from about 5 to 12% by weight of the total composition, and the substituent

ranging from about 5 to 12% by weight of the total composition wherein R' is selected from the group consisting of straight chain alkyl groups having three to five carbon atoms, and wherein the saturated ring has a trans conformation, at least one of said compounds having R as an alkyl group with two to five carbon atoms and wherein compounds having R as an alkyl group with two to four carbon atoms range from about 3 to 10% by weight of the total composition and at least one of said compounds having R as an alkyl group with seven to ten carbon atoms ranging from about 20 to 50% by weight of the total composition;

(b) at least one cyclohexane carboxylate ester compound represented by the formula:

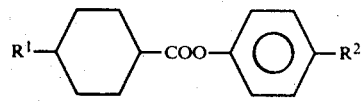

wherein $R^1$ is selected from the group consisting of straight chain alkyl groups having two to three carbon atoms, wherein $R^2$ is selected from the group consisting of straight chain alkoxy groups having three to six carbon atoms, and wherein the saturated ring has a trans conformation; and (c) at least one para-substituted phenyl benzoate ester represented by the formula:

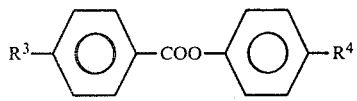

wherein $R^3$ is selected from the group consisting of straight chain alkyl groups having three to seven carbon atoms, and wherein $R^4$ is selected from the group consisting of straight chain alkyl groups having five to nine carbon atoms, subject to the proviso that the cyanobiphenyls range from about 67% to about 78% by weight of the composition, the cyclohexane carboxylate esters range from about 14% to about 21% by weight of the composition, and the phenyl benzoate esters range from about 8% to about 12% by weight of the composition, and subject to the further proviso that the cyanobiphenyl compounds include an embodiment having the above described saturated ring which constitutes from about 5% to about 12% by weight of the entire composition.

The mixtures of the present invention have positive dielectric anisotropy and electro-optic characteristics suitable for multiplexing at least seven lines (14% duty cycle) in a twisted nematic display. The compositions of the invention have moderate viscosity and a birefringence of 0.16 to 0.19, making them usable in displays with cell spacings of approximately 7 μm. The compositions are chemically and photochemically stable.

DETAILED DESCRIPTION OF THE INVENTION

In a copending patent application, U.S. Ser. No. 191,774, filed Sept. 29, 1980, it is disclosed that specific organobiphenyls, cyclohexane carboxylate esters and diesters, in restricted composition ranges, produce a nematic phase of −20° to +50° C., together with the required electro-optical performance for multiplexed twisted nematic display devices. Furthermore, these materials have a high birefringence, medium viscosity, low threshold and exhibit excellent alignment behavior on the surface treatments commonly used in twisted nematic display devices.

Generally speaking, it was observed that the preferred cyanobiphenyls were the longer chain alkyl compounds. In mixtures with the disclosed esters, an undesired smectic phase was observed over a wide composition range, and to produce the desired nematic phase, only specific composition ranges could be used. However, it was found that this condition could be satisfied and give materials with steep transmission vs. voltage characteristics suitable for multiplexed twisted nematic display devices.

It was desirable to add specific diester materials only in certain composition ranges to avoid induced smectic phases and deterioration in electro-optical performance. Further experimentation has shown that other monoesters are most advantageous for multiplexing performance and the present invention shows how these dialkyl phenyl benzoate esters may be used in this context.

While the prior art discloses the use of alkyl-alkoxy phenyl benzoate esters, the dialkyl compounds have not been considered owing to their low clearing points (nematic-isotropic transition). The present invention shows that this obvious limitation, is outweighed by their low viscosity and enhancement of electro-optical performance in mixtures with specific cyanobiphenyls.

It was observed that even in low weight percentages, the dialkyl phenyl benzoate esters improved the electro-optical performance of the preferred longer chain alkyl cyanobiphenyls. Furthermore, the long chain ester compounds gave the most beneficial effect, and were much superior to other esters of the alkyl-alkoxy phenyl benzoate ester type or even the cyclohexane carboxylate esters.

However, it was not possible to mix the preferred longer chain esters and cyanobiphenyls across the whole composition range without inducing a smectic phase. Indeed the enhancement of smectic behavior was greater in these dialkyl phenyl benzoate esters than in similar compositions with cyclohexane carboxylate esters.

It was observed that the desirable properties of the dialkyl benzoate esters could be utilized in combination with cyclohexane carboxylate esters and longer chain alkyl cyanobiphenyls to give materials with improved electro-optical performance over those in which the dialkyl esters were not present. Where these two types of esters were used above a minimum percentage of the composition, a steeper transmission vs. voltage curve was found and below a certain maximum percentage of the total composition, a nematic phase to a lower temperature of −20° C. was observed.

Unlike the corresponding alkyl-alkoxy phenyl benzoate esters, the dialkyl compounds did not produce an increase in viscosity or show alignment problems in mixtures with cyanobiphenyls.

Although it is preferable to use entirely the longer chain alkyl cyanobiphenyls, i.e., seven carbon atoms, the strong tendency to induced smectic behavior required that at least one compound with an alkyl chain of two to five carbon atoms be present but preferably in a low percentage of the total composition.

For practical applications, the nematic phase should exist to an upper temperature of not less than 50° C., and preferably, to greater than 55° C. In the mixtures of the present invention, it is necessary to add a material with a higher clearing point.

A number of different classes of such materials were examined i.e., cyanoterphenyls, diesters, and it was found that such compounds produce an increase tendency towards induced smectic phases, increase in viscosity and decrease in steepness of the transmission vs voltage curve. The materials with the least affect on these properties were the cyclohexyl alkyl substituted cyanobiphenyls and these were used in the minimum weight percentage of the total composition to produce the desired practical temperature range.

The compositions of the invention contain three essential classes of compounds in specified amounts: cyanobiphenyls, cyclohexane carboxylate esters and phenyl benzoate esters.

From the cyanobiphenyl class, from three to five cyanobiphenyl compounds are essential to the composition of the present invention. These cyanobiphenyls are represented by the formula:

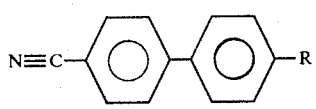

wherein R is selected from the group consisting of straight chain alkyl groups having two to ten carbon atoms, the propoxy radical, and the substituent

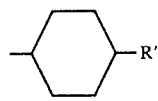

wherein R' is selected from the group consisting of straight chain alkyl groups having three to five carbon atoms, and wherein the saturated ring has a trans conformation. It is required that at least one of these compounds has R as an alkyl group having two to five carbon atoms. Additionally, it is required that the cyanobiphenyls incude an embodiment having the above-described saturated ring substituent in specified amounts. It has been discovered that if only one or two cyanobiphenyl compounds are employed in the composition of the present invention, adequate melting point temperature depression will not be achieved and nematic range may be inferior. It is by the inclusion of the specified number of cyanobiphenyls and the specific cyanobiphenyl having the saturated ring that desirable depression and nematic range are achieved. Further, desirably, at least four cyanobiphenyls are present in the composition of the present invention and, preferably, one contains a propoxy group. These desired and preferred embodiments appear to also result in wider temperature ranges. Examples of suitable cyanobiphenyls useful in the practice of the present invention include compounds in which R is —$C_2H_5$, —$C_5H_{11}$, —$C_6H_{13}$, —$C_7H_{15}$, —$C_8H_{17}$, —$C_{10}H_{21}$ and —$OC_3H_7$.

At least one cyclohexane carboxylate ester is also present in the compositions of the present invention. The cyclohexane carboxylate esters are represented by the formula:

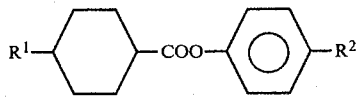

wherein $R^1$ is selected from the group consisting of straight chain alkyl groups having two to three carbon atoms, $R^2$ is selected from the group consisting of straight chain alkoxy groups having three to six carbon atoms, and wherein the saturated ring has a trans conformation. Examples of suitable cyclohexane carboxylate esters useful in the practice of the invention include compounds in which $R^1$ is —$C_3H_7$ and $R^2$ is —$OC_5H_{11}$ and —$OC_6H_{13}$.

At least one para-substituted phenyl benzoate ester is also present in the composition of the present invention. These esters are represented by the formula:

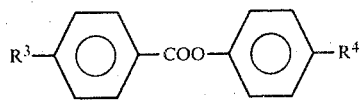

wherein $R^3$ is selected from the group consisting of straight chain alkyl groups having three to seven carbon atoms, $R^4$ is selected from the group consisting of straight chain alkyl groups having five to nine carbon atoms. Examples of suitable para-substituted phenyl benzoate esters useful in the practice of the invention includes compounds in which $R^3$ is —$C_5H_{11}$ and —$C_7H_{15}$ and $R^4$ is —$C_7H_{15}$ and —$C_9H_{19}$.

The biphenyls constitute in total from about 67% to about 78% by weight of the composition, the cyclohexane carboxylate esters range from about 14% to about 21% by weight of the composition and the para-substituted phenyl benzoate esters range from about 8% to about 12% by weight of the composition. Also, the required cyanobiphenyl compound with the described saturated ring substituent is included in the mentioned amounts for the cyanobiphenyl compounds and must in itself constitute from about 5% to about 12% by weight of the entire composition.

The liquid crystal compositions of the present invention advantageously exhibit a nematic phase over the temperature range of at least about −20° C. to 50° C. or greater, have a positive dielectric anisotropy and have electro-optic characteristics suitable for multiplexing at least seven lines (14% duty cycle) in a twisted nematic display. The compositions of the present invention have moderate viscosity and a birefringence of 0.16 to 0.19, thus making them usable in displays with cell spacings of about 7 μm. The compositions are chemically and photochemically stable.

Compositions outside the ranges given above may not evidence a nematic phase over the desired indicated temperature range and are thus unusable for superior multiplex displays.

The following examples are presented for illustrative purposes and the present invention should not be construed as being limited thereto.

EXAMPLES OF THE PRESENT INVENTION

The following compositions were prepared using the three classes of compounds encompassed by the present invention but employing amounts of constituents both inside and outside the scope of the present invention.

The para-substituted cyanobiphenyls were purchased from EM Labs (New York, N.Y.) and were used without further purification. The trans parasubstituted cyclohexane para-alkoxyphenyl esters were prepared by standard techniques; see Neubert et al, *Liquid Crystals and Ordered Fluids,* Vol. 2, page 293, Plenum Press, 1973. The trans para-substituted cyclohexane carboxylic acids were prepared from the commercially available benzoic acid analogs by hydrogenation using Raney nickel catalysts by the procedure set forth in U.S. Pat. No. 4,113,647. The para-substituted alkoxyphenols were obtained commercially from Aero Chemicals (Newark, N.J.). The para-substituted phenyl benzoate esters were prepared by known procedures.

The appropriate weight percentages of the individual components were mixed together by stirring and heating in an isotropic phase at about 60° C. to 70° C. Transition temperatures were determined by hot stage microscopy (Mettler FP5+FP 52). The birefringence of the liquid crystal mixtures was determined by a calibrated wedge technique as described by Haller et al, *Molecular Crystals and Liquid Crystals,* Vol. 16, pp. 53–59, 1972. Typical values were obtained ranging from 0.16 to 0.19. The viscosity of the liquid crystal mixtures was determined using calibrated viscometer (Cannon Fenske, State College, Pa.). Typical values were 40 to 60 cst at 25° C.

EXAMPLE 1 (Present Invention)

Component (a):
(i) N≡C—⟨C₆H₄⟩—⟨C₆H₄⟩—C₅H₁₁    38.1 wt %
(ii) N≡C—⟨C₆H₄⟩—⟨C₆H₄⟩—C₇H₁₅    26.2 wt %
(iii) N≡C—⟨C₆H₄⟩—⟨C₆H₄⟩—⟨C₆H₁₀⟩—C₅H₁₁    8.9 wt %
                                     73.2 wt %

Component (b):
C₃H₇—⟨C₆H₁₀⟩—CO.O—⟨C₆H₄⟩—OC₆H₁₃    15.9 wt %

Component (c):
C₇H₁₅—⟨C₆H₄⟩—CO.O—⟨C₆H₄⟩—C₅H₁₁    10.9 wt %

EXAMPLE 2

| Component (a): | |
|---|---|
| (i) Same as Example 1 | 33.3 wt % |
| (ii) Same as Example 1 | 22.9 wt % |
| (iii) Same as Example 1 | 11.0 wt % |
| | 67.2 wt % |
| Component (b): | |
| Same as Example 1 | 19.5 wt % |
| Component (c): | |
| Same as Example 1 | 13.3 wt %* |

*Outside scope of present invention

EXAMPLE 3 (Present Invention)

Component (a):
(i) N≡C—⟨C₆H₄⟩—⟨C₆H₄⟩—C₂H₅    9.8 wt %
(ii) Same as Example 1    28.8 wt %
(iii) Same as Example 1    12.6 wt %
                            18.0 wt %
(iv) N≡C—⟨C₆H₄⟩—⟨C₆H₄⟩—C₁₀H₂₁    69.2 wt %

Component (b):
C₃H₇—⟨C₆H₁₀⟩—CO.O—⟨C₆H₄⟩—OC₅H₁₁    20.5 wt %

Component (c):
C₇H₁₅—⟨C₆H₄⟩—CO.O—⟨C₆H₄⟩—C₇H₁₅    10.3 wt %

EXAMPLE 4

| Component (a): | |
|---|---|
| (i) Same as Example 3 | 9.5 wt % |
| (ii) Same as Example 3 | 27.8 wt % |
| (iii) Same as Example 3 | 12.1 wt % |
| (iv) Same as Example 3 | 17.4 wt % |
| | 66.8 wt % |
| Component (b): | |
| Same as Example 3 | 19.8 wt % |
| Component (c): | |
| Same as Example 3 | 13.4 wt %* |

*Outside scope of present invention

EXAMPLE 5 (Present Invention)

| Component (a): | |
|---|---|
| (i) Same as Example 1 | 29.5 wt % |
| (ii) Same as Example 1 | 19.7 wt % |
| (iii) Same as Example 1 | 11.5 wt % |
| (iv) Same as Example 3 | 9.2 wt % |
| | 69.9 wt % |
| Component (b): | |
| Same as Example 3 | 20.3 wt % |
| Component (c): | |
| Same as Example 3 | 9.8 wt % |

EXAMPLE 6

| Component (a): | |
|---|---|
| (i) Same as Example 5 | 23.9 wt % |
| (ii) Same as Example 5 | 15.9 wt % |
| (iii) Same as Example 5 | 9.3 wt % |
| (iv) Same as Example 5 | 7.4 wt % |
| | 56.5 wt % |
| Component (b): | |
| Same as Example 5 | 29.3 wt %* |
| Component (c): | |
| Same as Example 5 | 14.2 wt %* |

EXAMPLE 7 (Present Invention)

Component (a):
(i) Same as Example 1    4.3 wt %
(ii) Same as Example 1    18.6 wt %
(iii) Same as Example 1    11.3 wt %
                           28.3 wt %
(iv) N≡C—⟨C₆H₄⟩—⟨C₆H₄⟩—C₈H₁₇

*Outside scope of present invention

EXAMPLE 7 (Present Invention)-Continued 9.3 wt %
(v) N≡C—⟨C₆H₄⟩—⟨C₆H₄⟩—OC₃H₇    71.8 wt %

Component (b):
Same as Example 3    18.8 wt %
Component (c):
Same as Example 3    9.4 wt %

EXAMPLE 8

| Component (a): | |
|---|---|
| (i) Same as Example 7 | 2.9 wt % |
| (ii) Same as Example 7 | 16.6 wt % |
| (iii) Same as Example 7 | 15.3 wt %* |
| (iv) Same as Example 7 | 25.1 wt % |
| (v) Same as Example 7 | 8.5 wt % |
| | 68.4 wt % |
| Component (b): | |
| Same as Example 7 | 21.0 wt % |
| Component (c): | |

-continued

| | |
|---|---|
| Same as Example 7 | 10.6 wt % |

EXAMPLE 9

| | |
|---|---|
| Component (a): | |
| (i) Same as Example 7 | 3.7 wt % |
| (ii) Same as Example 7 | 16.2 wt % |
| (iii) Same as Example 7 | 9.8 wt % |
| (iv) Same as Example 7 | 24.6 wt % |
| (v) Same as Example 7 | 8.2 wt % |
| | 62.5 wt % |
| Component (b): | |
| Same as Example 7 | 25.0 wt %* |
| Component (c): | |
| Same as Example 7 | 12.5 wt %* |

*Outside scope of present invention

EXAMPLE 10 (Present Invention)

| | |
|---|---|
| Component (a): | |
| (i) Same as Example 1 | 3.6 wt % |
| (ii) Same as Example 1 | 20.4 wt % |
| (iii) Same as Example 1 | 10.0 wt % |
| (iv) Same as Example 7 | 31.0 wt % |
| (v) Same as Example 7 | 10.5 wt % |
| | 75.5 wt % |
| Component (b): | |
| Same as Example 1 | 14.5 wt % |
| Component (c): | |
| Same as Example 1 | 10.0 wt % |

EXAMPLE 11

| | |
|---|---|
| Component (a): | |
| (i) Same as Example 10 | 3.2 wt % |
| (ii) Same as Example 10 | 18.1 wt % |
| (iii) Same as Example 10 | 9.0 wt % |
| (iv) Same as Example 10 | 27.4 wt % |
| (v) Same as Example 10 | 9.3 wt % |
| | 67.0 wt % |
| Component (b): | |
| Same as Example 10 | 24.0 wt %* |
| Component (c): | |
| Same as Example 10 | 9.0 wt % |

EXAMPLE 12 (Present Invention)

| | |
|---|---|
| Component (a): | |
| (i) Same as Example 1 | 6.0 wt % |
| (ii) Same as Example 1 | 24.3 wt % |
| (iii) Same as Example 1 | 9.7 wt % |
| (iv) Same as Example 3 | 17.4 wt % |
| (v) Same as Example 7 | 11.3 wt % |
| | 68.7 wt % |

*Outside scope of present invention

EXAMPLE 12 (Present Invention)-Continued

| | |
|---|---|
| Component (b): | |
| Same as Example 3 | 29.8 wt % |
| Component (c): | |
| Same as Example 3 | 10.5 wt % |

EXAMPLE 13

| | |
|---|---|
| Component (a): | |
| (i) Same as Example 12 | 5.6 wt % |
| (ii) Same as Example 12 | 22.6 wt % |
| (iii) Same as Example 12 | 9.0 wt % |
| (iv) Same as Example 12 | 16.2 wt % |
| (v) Same as Example 12 | 10.5 wt % |
| | 63.9 wt % |
| Component (b): | |
| Same as Example 12 | 19.5 wt % |
| Component (c): | |
| Same as Example 12 | 16.6 wt %* |

EXAMPLE 14 (Present Invention)

| | |
|---|---|
| Component (a): | |
| (i) N≡C—⟨⟩—⟨⟩—C$_2$H$_5$ | 10.0 wt % |
| (ii) N≡C—⟨⟩—⟨⟩—C$_6$H$_{13}$ | 22.7 wt % |
| (iii) N≡C—⟨⟩—⟨⟩—C$_7$H$_{15}$ | 14.8 wt % |

*Outside scope of present invention

EXAMPLE 14 (Present Invention)-Continued

| | |
|---|---|
| (iv) N≡C—⟨⟩—⟨⟩—C$_{10}$H$_{21}$ | 11.6 wt % |
| (v) N≡C—⟨⟩—⟨⟩—⟨⟩—C$_5$H$_{11}$ | 9.8 wt % |
| | 73.9 wt % |
| Component (b): | |
| Same as Example 3 | 17.4 wt % |
| Component (c): | |
| Same as Example 3 | 8.7 wt % |

EXAMPLE 15

| | |
|---|---|
| Component (a): | |
| (i) Same as Example 14 | 8.6 wt % |
| (ii) Same as Example 14 | 23.9 wt % |
| (iii) Same as Example 14 | 12.8 wt % |
| (iv) Same as Example 14 | 10.0 wt % |
| (v) Same as Example 14 | 12.2 wt % |
| | 67.5 wt % |
| Component (b): | |
| Same as Example 14 | 21.6 wt %* |
| Component (c): | |
| Same as Example 14 | 10.9 wt % |

EXAMPLE 16 (Present Invention)

| | |
|---|---|
| Component (a): | |
| (i) Same as Example 1 | 3.5 wt % |
| (ii) Same as Example 1 | 20.8 wt % |
| (iii) Same as Example 1 | 8.2 wt % |
| (iv) Same as Example 7 | 31.3 wt % |
| (v) Same as Example 7 | 10.5 wt % |
| | 74.3 wt % |

*Outside scope of present invention

EXAMPLE 16 (Present Invention)-Continued

Component (b):

(i) $C_3H_7$—⟨ ⟩—CO.O—⟨ ⟩—$OC_5H_{11}$    7.9 wt %

(ii) $C_3H_7$—⟨ ⟩—CO.O—⟨ ⟩—$OC_6H_{13}$    7.9 wt %

Component (c):
Same as Example 3    9.9 wt %

EXAMPLE 17

| Component (a): | |
|---|---|
| (i) Same as Example 16 | 3.0 wt % |
| (ii) Same as Example 16 | 17.6 wt % |
| (iii) Same as Example 16 | 10.6 wt % |
| (iv) Same as Example 16 | 26.7 wt % |
| (v) Same as Example 16 | 9.0 wt % |
| Component (b): | |
| (i) Same as Example 16 | 10.1 wt % |
| (ii) Same as Example 16 | 10.1 wt % |
| Component (c): | |
| Same as Example 16 | 12.9 wt %* |

EXAMPLE 18

| Component (a): | |
|---|---|
| (i) Same as Example 1 | 3.1 wt % |
| (ii) Same as Example 1 | 17.8 wt % |
| (iii) Same as Example 1 | 11.2 wt % |
| (iv) Same as Example 7 | 26.9 wt % |
| (v) Same as Example 7 | 9.1 wt % |
| | 68.1 wt % |

*Outside scope of present invention

EXAMPLE 18-Continued

Component (b):

$C_5H_{11}$—⟨ ⟩—CO.O—⟨ ⟩—$OC_5H_{11}$    20.0 wt %*

Component (c):
Same as Example 3    11.9 wt %

*This compound outside scope of present invention

TABLE 1

| | Nematic Ranges | |
|---|---|---|
| Example | Within Scope of Present Invention | Nematic Ranges (Degrees Centigrade) |
| 1 | Yes | < −20 to 57.1 |
| 2 | No | 17.9 to 62.2 |
| 3 | Yes | < −20 to 62.2 |
| 4 | No | 10.1 to 61.3 |
| 5 | Yes | < −20 to 61.8 |
| 6 | No | 36.1 to 62.0 |
| 7 | Yes | < −20 to 63.2 |
| 8 | No | 8.0 to 71.0 |
| 9 | No | 30.1 to 63.4 |
| 10 | Yes | < −20 to 61.4 |
| 11 | No | 20.3 to 63.0 |
| 12 | Yes | < −20 to 63.2 |
| 13 | No | 38.0 to 61.5 |
| 14 | Yes | < −20 to 55.1 |
| 15 | No | 10.7 to 60.4 |
| 16 | Yes | < −20 to 58.7 |
| 17 | No | 28.7 to 64.0 |
| 18 | No | 39.6 to 67.5 |

Table 1 shows the nematic range for compositions inside the scope of the invention and outside the scope of the invention. It will be readily seen that those within the scope of the invention evidence the desired temperature range for nematic phase existence ($< -20°$ C. to at least 50° C.), while those outside the scope of the invention evidence less desirable temperature ranges for nematic phase existence.

The contrast versus voltage characteristics of the liquid crystal compositions of the invention were measured in a twisted nematic cell. The cell was constructed from patterned conductive coated glass spaced apart and sealed using Ablefilm 517 epoxy preforms.

Alignment was obtained by oblique angle deposition (30°) of silicon monoxide (500 Å) and rubbing to produce uniform low tilt surfaces, as is known in the art. Cell spacing was measured by light section microscopy and the capacitance of the empty cell. The cell spacing was typically about 7 $\mu$m.

The filled cell was placed between crossed polarizers (41% transmission), and the contrast in the reflective mode was measured as a function of a variable square wave voltage applied to the display. A photometer (Spotmeter, Photo Research, Burbank, California) was used to measure the change in brightness.

Of particular importance in assessing the multiplexing characteristics of the display are:

1. Threshold voltage at normal incidence $V_{10}^{90°}$ (defined as a 10% change in brightness).
2. Threshold voltage at 45° off normal incidence in the preferred viewing quadrant, $V_{10}^{45°}$ (defined as a 10% change in brightness).
3. Voltage $V_{50}^{90°}$ at normal incidence (defined as a 50% change in brightness).
4. Saturation voltage at normal incidence $V_{90}^{90°}$ (defined as a 90% change in brightness).

To relate their values to the performance of the compositions, merit numbers are defined, $V_{90}^{90°}/V_{10}^{45°}$ and $V_{50}^{90°}/V_{10}^{45°}$. For examples of other liquid crystal compositions, where these ratios have been determined, see E. P. Raynes, "*Recent Advances in Liquid Crystal Materials and Display Devices*", IEEE/SID Biennial Display Research Conference Proceedings, pp. 8–11, 1979.

The liquid crystal compositions of this invention, as evidenced by the above, have merit numbers for the ratios $V_{90}^{90°}/V_{10}^{45°}$ and $V_{50}^{90°}/V_{10}^{45°}$ of $\leq 1.700$ and $\leq 1.390$ respectively, when measured under the conditions described at 25° C.

When the duty cycle of multiplexing is 1 in 7 (14%), the ratio $V_{50}^{90°}/V_{10}^{45°}$ should be $\leq 1.488$ to achieve a head on contrast ratio of $\geq 2:1$. Where the duty cycle is 1 in 10 (10%), this ratio should be $\leq 1.387$ for a $\geq 2:1$ contrast ratio. For a head on contrast ratio of $\geq 2:1$, at 20° off axis in the preferred viewing direction, a contrast ratio of $\geq 10:1$ is seen.

The following results were obtained employing the mixtures listed in Table 2 below:

TABLE 2

| | Voltage Characteristics | | | | | |
|---|---|---|---|---|---|---|
| Example | $V_{10}^{45°}$ | $V_{10}^{90°}$ | $V_{50}^{90°}$ | $V_{90}^{90°}$ | $V_{50}^{90°}/V_{10}^{45°}$ | $V_{90}^{90°}/V_{10}^{45°}$ |
| 7 | 1.35V | 1.52V | 1.78V | 2.20V | 1.319 | 1.630 |
| 12 | 1.38V | 1.63V | 1.84V | 2.26V | 1.333 | 1.638 |
| 5 | 1.34V | 1.59V | 1.81V | 2.24V | 1.351 | 1.672 |

As can be seen, the ratio $V_{50}^{90°}/V_{10}^{45°}$ for the liquid crystal compositions of the invention are 1.390 and where temperature compensation is used, provide at least 1 in 7 duty cycle multiplexing. Furthermore, a 2:1 contrast ratio may be obtained at a 1 in 10 duty cycle of multiplexing.

Where temperature compensation is not done, the $V_{off}$ voltage is set equal to $V_{10}^{45°}$ at the upper temperature of operation, typically 40° C., to avoid "crosstalk" at lower temperatures. By doing this, the duty cycle of multiplexing, to achieve a particular contrast ratio, has to be decreased. For the liquid crystal compositions of this invention, the temperature dependence of the threshold voltage $V_{10}^{45°}$ is 8–10 mV/°C. Therefore, for the liquid crystal compositions of this invention, a head on contrast ratio of 2:1 is obtained with a duty cycle of 1 in 7 (14%), over the temperature range of 0° C. to 40° C.

What is claimed is:

1. A liquid crystal composition for multiplexed twisted neumatic display which exists in a nematic mesophase from at least about −20° to 50° C., comprising:

(a) From three to five cyanobiphenyl compounds represented by the formula:

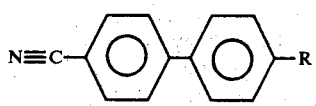

wherein R is selected from the group consisting of straight chain alkyl groups having two to ten carbon atoms, the propoxy radical ranging from about 5 to 12% by weight of the total composition, and the substituent

ranging from about 5 to 12% by weight of the total composition wherein R' is selected from the group consisting of straight chain alkyl groups having three to five carbon atoms, and wherein the saturated ring has a trans conformation, at least one of said compounds having R as an alkyl group with two to five carbon atoms and wherein the sum of compounds having R as an alkyl group with two to four carbon atoms ranges from about 3 to 10% by weight of the total composition and at least one of said compounds having R as an alkyl group with seven to ten carbon atoms and wherein the sum thereof ranges from about 20 to 50% by weight of the total composition;

(b) at least one cyclohexane carboxylate ester compound represented by the formula:

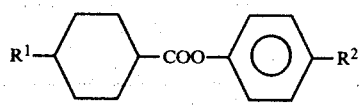

wherein $R^1$ is selected from the group consisting of straight chain alkyl groups having two to three carbon atoms, wherein $R^2$ is selected from the group consisting of straight chain alkoxy groups having three to six carbon atoms, and wherein the saturated ring has a trans conformation; and (c) at least one para-substituted phenyl benzoate ester represented by the formula:

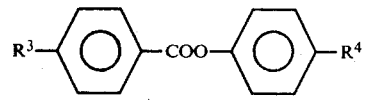

wherein $R^3$ is selected from the group consisting of straight chain alkyl groups having three to seven carbon atoms, and wherein $R^4$ is selected from the group consisting of straight chain alkyl groups having five to nine carbon atoms, subject to the proviso that the cyanobiphenyls range from about 67% to about 78% by weight of the composition, the cyclohexane carboxylate esters range from about 14% to about 21% by weight of the composition, and the phenyl benzoate esters range from about 8% to about 12% by weight of the composition, and subject to the further proviso that the cyanobiphenyl compounds include an embodiment having the above described saturated ring which constitutes from about 5% to about 12% by weight of the entire composition.

2. The composition of claim 1 in which at least four cyanobiphenyl compounds are present.

3. The composition of claim 1 in which it is preferred to have one of the cyanobiphenyl compounds with a seven carbon alkyl group for R.

4. The composition of claim 2 in which one of the compounds is a propoxy compound.

5. The composition of claim 1 in which R is selected from the group consisting of —C$_2$H$_5$, —C$_5$H$_{11}$, —C$_6$H$_{13}$, —C$_7$H$_{15}$, —C$_8$H$_{17}$, —C$_{10}$H$_{21}$ and —OC$_3$H$_7$, $R^1$ is —C$_3$H$_7$, $R^2$ is selected from the group consisting of —OC$_5$H$_{11}$ and —OC$_6$H$_{13}$, $R^3$ is selected from the group consisting of —C$_5$H$_{11}$ and —C$_7$H$_{15}$ and $R^4$ is selected from the group consisting of —C$_7$H$_{15}$ and —C$_9$H$_{19}$.

6. The composition of claim 5 consisting essentially of

| | |
|---|---|
| N≡C—⟨O⟩—⟨O⟩—C$_5$H$_{11}$ | 4.3 wt % |
| N≡C—⟨O⟩—⟨O⟩—C$_7$H$_{15}$ | 18.6 wt % |
| N≡C—⟨O⟩—⟨O⟩—C$_8$H$_{17}$ | 28.3 wt % |
| N≡C—⟨O⟩—⟨O⟩—OC$_3$H$_7$ | 9.3 wt % |
| N≡C—⟨O⟩—⟨O⟩—⟨O⟩—C$_5$H$_{11}$ | 11.3 wt % |
| C$_3$H$_7$—⟨O⟩—CO.O—⟨O⟩—OC$_5$H$_{11}$ | 18.8 wt % |
| C$_7$H$_{15}$—⟨O⟩—CO.O—⟨O⟩—C$_7$H$_{15}$ | 9.4 wt % |

7. The composition of claim 5 consisting essentially of

| | |
|---|---|
| N≡C—⟨⟩—⟨⟩—C₅H₁₁ | 6.0 wt % |
| N≡C—⟨⟩—⟨⟩—C₇H₁₅ | 24.3 wt % |
| N≡C—⟨⟩—⟨⟩—C₁₀H₂₁ | 17.4 wt % |
| N≡C—⟨⟩—⟨⟩—OC₃H₇ | 11.3 wt % |
| N≡C—⟨⟩—⟨⟩—⟨⟩—C₅H₁₁ | 9.7 wt % |
| C₃H₇—⟨⟩—CO.O—⟨⟩—OC₅H₁₁ | 20.8 wt % |
| C₇H₁₅—⟨⟩—CO.O—⟨⟩—C₇H₁₅ | 10.5 wt % |

8. The composition of claim 5 consisting essentially of

| | |
|---|---|
| N≡C—⟨⟩—⟨⟩—C₅H₁₁ | 29.5 wt % |
| N≡C—⟨⟩—⟨⟩—C₇H₁₅ | 19.7 wt % |
| N≡C—⟨⟩—⟨⟩—C₁₀H₂₁ | 9.2 wt % |
| N≡C—⟨⟩—⟨⟩—⟨⟩—C₅H₁₁ | 11.5 wt % |
| C₃H₇—⟨⟩—CO.O—⟨⟩—OC₅H₁₁ | 20.3 wt % |
| C₇H₁₅—⟨⟩—CO.O—⟨⟩—C₇H₁₅ | |

* * * * *

UNITED STATES PATENT AND TRADEMARK OFFICE
CERTIFICATE OF CORRECTION

PATENT NO. : 4,309,304

DATED : January 5, 1982

INVENTOR(S) : Kenneth J. Harrison and Leo T. Carlino

It is certified that error appears in the above—identified patent and that said Letters Patent is hereby corrected as shown below:

Col. 9, line 20, the weight percent of iii is 8.9%; 73.2 is the total of component (a).

Col. 9, line 51, insert a total line after 18.0 wt % and above 69.2 wt %.

Col. 10, line 51, the weight percent of v is 9.3%; 71.8 is the total of component (a).

Col. 11, line 65, replace "29.8 wt %" with --20.8 wt %--.

Col. 12, line 23, replace "22.7 wt%" with --27.7 wt%--.

Col. 12, line 36, the weight percent of v is 9.8%; 73.9 wt % is the total of component (a).

Col. 13, line 20, the weight percent of 66.9 wt% is missing as a total.

Col. 13, line 63, replace "38.0" with --28.0--.

Col. 18, line 17, insert 9.8 wt% on the last component.

Signed and Sealed this

Fifth Day of July 1983

[SEAL]

Attest:

Attesting Officer

GERALD J. MOSSINGHOFF

Commissioner of Patents and Trademarks